United States Patent [19]

Barber

[11] Patent Number: 5,427,764
[45] Date of Patent: Jun. 27, 1995

[54] METHODS OF CONTROLLING FLOW OF FLUIDS REACTING AT SUPERCRITICAL CONDITIONS

[75] Inventor: John S. Barber, Georgetown, Tex.

[73] Assignee: RPC Waste Management Services, Inc., Austin, Tex.

[21] Appl. No.: 220,469

[22] Filed: Mar. 31, 1994

Related U.S. Application Data

[63] Continuation of Ser. No. 958,812, Oct. 9, 1992, abandoned.

[51] Int. Cl.⁶ ................................................. B01J 8/00
[52] U.S. Cl. ........................... 423/659; 423/DIG. 9; 423/DIG. 11; 210/512.1
[58] Field of Search ............ 423/450, 456, 577, 659, 423/DIG. 9, DIG. 11; 210/512.1

[56] References Cited

U.S. PATENT DOCUMENTS

| | | | |
|---|---|---|---|
| 3,431,075 | 3/1969 | Gunnell | 423/456 |
| 3,490,869 | 1/1970 | Heller | 423/456 |
| 4,146,359 | 3/1979 | Lumpkin et al. | 423/659 |
| 4,490,346 | 12/1984 | Cheng | 423/456 |
| 4,762,148 | 8/1988 | Marui et al. | 423/659 |
| 4,853,205 | 8/1989 | Tolley et al. | 423/472 |
| 4,859,347 | 8/1989 | Simon et al. | 210/788 |
| 5,110,581 | 5/1992 | Derrah | 423/479 |
| 5,238,671 | 8/1993 | Matson et al. | 423/397 |
| 5,252,297 | 10/1993 | Nakai | 422/150 |

Primary Examiner—Wayne Langel
Assistant Examiner—Timothy C. Vanoy
Attorney, Agent, or Firm—Jack A. Kanz

[57] ABSTRACT

High temperature reactions are conducted within a high pressure reaction vessel. The interior surfaces of the high pressure containment vessel are protected from the high temperature and corrosive effects of the reaction by causing the reactants to converge in a vortex which contains the highest reaction temperature within the central portions of the reactor. A toroidal reaction vessel is disclosed in which the reactants are directed into a vortex at the axis of origin of the torus by flow guides.

13 Claims, 4 Drawing Sheets

METHODS OF CONTROLLING FLOW OF FLUIDS REACTING AT SUPERCRITICAL CONDITIONS

This is a continuation of application Ser. No. 07/958,812 filed Oct. 9, 1992 now abandoned.

This invention relates to systems for controlling reactions occurring at very high temperatures under very high pressures. More particularly, it relates to methods and apparatus for controlling flow of fluids through a reaction vessel to permit reactions to occur at extremely high pressures and temperatures while protecting the reactor and its internal surfaces from the effects of high temperatures and contact with the reacting fluids under reaction conditions.

The rate at which many reactions occur is substantially increased to some extent by increased pressure and/or significantly increased by temperature. Furthermore, many reactions exhibit unique behavior when conducted under conditions which approximate or exceed supercritical water conditions. Unfortunately, commercial uses of reactions which occur at high temperatures under high pressures are limited by the lack of practical means for containing such reactions. It is well known, for example, that many inorganic salts are substantially insoluble in supercritical water at about 218 bar. However, when the pressure is increased to about 340 bar or higher, such inorganic salts remain substantially dispersed in a fluid stream of supercritical water. Thus reaction processes which would be severely complicated by salt precipitation at lower pressures can be effectively practiced at extremely high pressures because the salts tend to remain dispersed by dissolution and/or suspension. However, because of the inability of conventional materials to withstand the temperature and pressure conditions required, reactors for containing such reactions are not generally commercially practical. Many materials are known which will withstand the stresses of high pressures. Likewise, many materials are known which will withstand high temperatures and many materials are known which will remain substantially inert to various corrosive and oxidative reactions. However, very few materials are known which will withstand high temperature, high pressure and resist corrosion or oxidation under such conditions. Furthermore, the known materials which exhibit such characteristics are expensive and difficult to form into suitable vessels for containing sustained reactions at high temperatures and pressures.

The present invention provides reactor apparatus for conducting continuous sustained reactions at extremely high temperatures and high pressures without the necessity of using exotic materials. The reactor is designed to contain extremely high operating pressures by forming a reaction chamber contained within a high pressure shell. The inner surface of the reaction chamber is, of course, exposed to the reaction fluids contained therein. The entire reaction chamber is contained within a reinforced pressure jacket. The pressure jacket can be formed of less expensive high strength materials since its major function is to contain pressure. The reaction chamber, however, is structured to cause the fluids entering the chamber to circulate adjacent the walls of the chamber and migrate toward a central vortex as temperature of the reacting fluid increases. Thus the high temperature reaction is contained within a vortex spaced from the walls of the reactor and fluids at extremely high temperatures do not contact the walls of the reactor.

The reaction products are withdrawn directly from the vortex by an exit tube extending radially into the chamber. However, since the exit tube extends into the reactor from an external wall, the pressure gradients across the walls of the exit tube are relatively small at locations in which the exit tube is subjected to higher temperatures. Thus the reaction is generally confined to a reaction vortex by cooler fluids and no part of the reaction chamber is exposed to both high temperatures and high pressure gradients. Using the principles of the invention, reaction processes can be conducted in a reaction chamber at temperatures and pressures substantially greater than can otherwise be tolerated by the material of the reactor, and reaction conditions can be sustained using temperatures and pressures not previously practical for commercial use. Other features and advantages of the invention will become readily understood from the following detailed description taken in connection with the appended claims and attached drawing in which:

Figure 1:
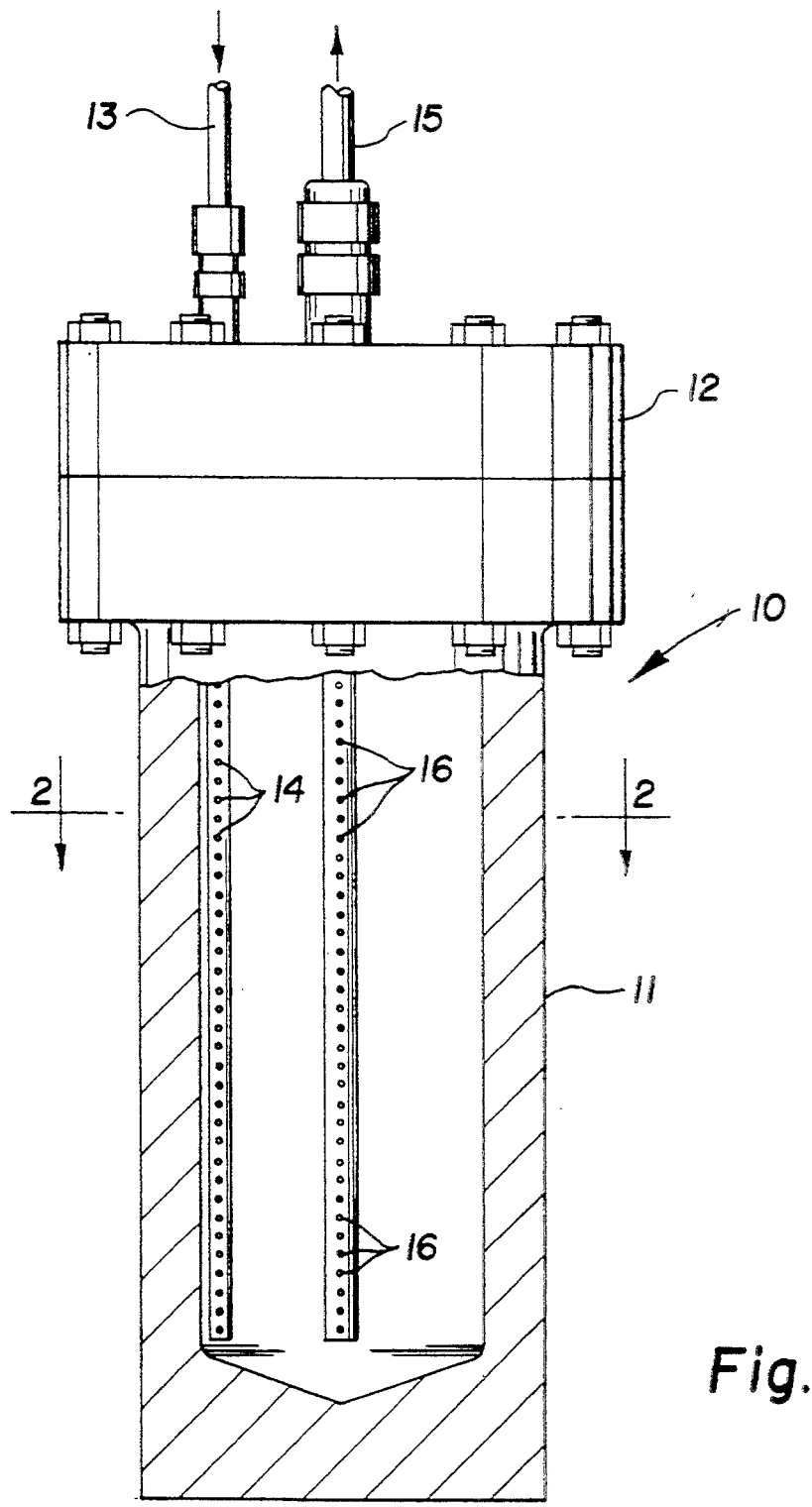
FIG. 1 is an elevational view, partially in section, of a simple form of reaction vessel employing the basic principles of the invention.
Figure 2:
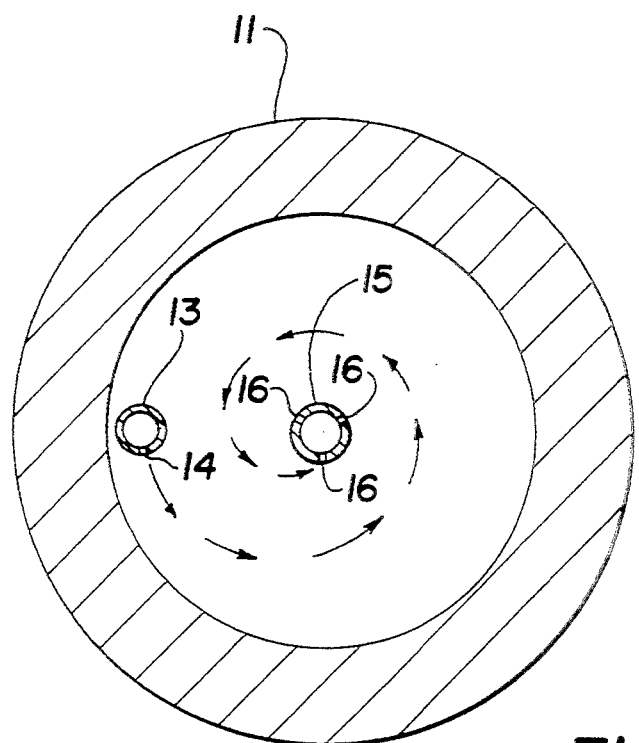
FIG. 2 is a sectional view of the reactor of FIG. 1 taken through the line 2—2.
Figure 6:
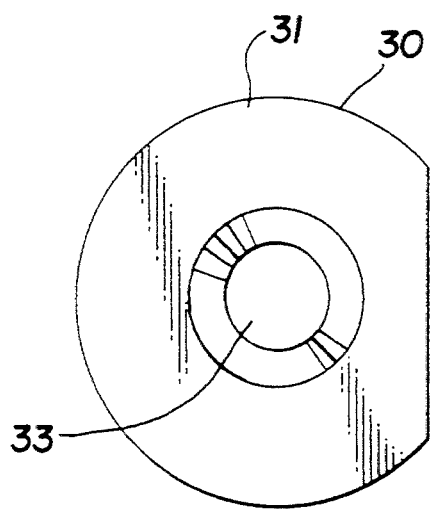
FIG. 6 is a side elevational view of the flow guide of FIG. 5.

The basic principles of the invention are illustrated in the simplified reactor 10 shown in FIGS. 1 and 2. The simplified reactor 10 comprises a cylinder 11 with an open end which is sealably enclosed by cap 12.

An inlet tube 13 extends axially through cap 12 into the interior of the cylinder 11. The inlet tube 13 is aligned adjacent the interior wall and has a plurality of openings 14 along the length thereof which direct fluid exiting therefrom into the cylinder tangentially with respect to the inner walls of the cylinder. Exit tube 15 extends through cap 12 and into the cylinder 11. Exit tube 15 is preferably positioned coaxially with the cylinder 11 and has a plurality of apertures 16 therein through which fluid within the interior of cylinder 11 may enter the exit tube 15 and exit the reactor. By aligning apertures 14 so that fluid entering the reactor through inlet 13 flows tangentially with respect to the cylinder walls, a fluid stream passing through the cylinder and out through exit tube 15 must flow in a substantially spiral pattern as indicated by the arrows in FIG. 2.

In the embodiment of FIGS. 1 and 2, the fluid injected through inlet 13 is a fluid stream containing water and at least two reactants which react when subjected to pressures and temperatures approximating that of supercritical water. Accordingly, the reactant stream is injected through inlet 13 under sufficient pressure to maintain supercritical water conditions within reactor 10 and maintain a pressure differential across the reactor so that the fluid will exit through exit tube 15. Since the fluid stream is injected tangentially to the walls, a circularly rotating motion is imparted to the fluid mass contained in the reactor 10. Since the fluid mass within the reactor rotates, the heavier portions are forced outwardly by centrifugal force. Cooler fluids are generally more dense than warmer fluids, thus the outer regions of the circulating mass will always be cooler than the inner regions. Furthermore, when water reaches supercritical conditions, its density decreases dramatically. Accordingly, if the temperature of the fluid is increased sufficiently between the inlet tube 13 and the exit tube 15, the fluid stream will reach supercritical conditions and the internal portions of the vortex formed surrounding the outlet 15 will be at supercritical conditions. Thus, the less dense material will always migrate toward the exit 15. In this manner, the reactions occurring at supercritical water conditions are confined to a vortex formed by the circulating mass, the cooler portions of the rotating mass always circulating adjacent the walls of the cylinder and protecting the cylinder walls from the reaction conditions of the reacting mass circulating at the vortex surrounding exit tube 15 under temperature and pressure conditions approximating or exceeding those of supercritical water.

In the preferred embodiment, the reaction which occurs within the reactor 10 is exothermic and occurs autogenously when the minimum required pressure and temperature conditions are obtained. To achieve the desired controlled reaction, the reactants may be mixed immediately prior to injection into inlet tube 13 or may be injected into the reactor in parallel inlet tubes (not shown) so that mixing of the reactants occurs within the reactor. The particulars of each reaction occurring upon mixing of reactants obviously depends on the particular reactants. For purposes of this disclosure, such individual particulars are not pertinent to the invention except for the requirement that the reactants must be selected and injected so that conditions which approximate or exceed supercritical occur between the inlet 13 and outlet 15. If complete reaction is required, the reactants are injected in substantially stoichiometric quantities. In some cases, however, an excess of one reactant may be injected to assure complete reaction with the other reactant.

It will be recognized that in many reaction systems, some reaction will occur when the reactants are mixed even if supercritical conditions do not exist. However, the reaction is greatly enhanced when conditions approximating supercritical are reached. For purposes of this disclosure, it is assumed that the major reaction occurs near or above supercritical conditions and reactions occurring prior to reaching these conditions are not considered material.

In most cases the reaction is exothermic. Accordingly, the reaction may be autogenously maintained by the heat generated by the reaction itself. Thus reactants injected in the reactor 10 via inlet 13 (or other inlets) are injected tangentially and begin to rotate adjacent the interior wall. As the less dense fluids spiral inwardly and become thoroughly mixed, the temperature of the reaction fluid is raised by the heat of reaction. Supercritical water is much less dense than the water stream injected, thus as the fluid becomes supercritical, the hotter and less dense fluid is forced inwardly to form a vortex at the axis of the rotating mass. The fluid at the axial center, however, is near or above supercritical conditions and the supercritical reaction is therefore confined to the central cylindrical portion immediately surrounding or within the exit tube 15.

If the flow rates and concentrations of reactants are properly maintained, a continuous reaction is maintained between the inlet tube 13 and the outlet tube 15. Heat, of course, must be injected into the reaction fluid either by the heat generated by an exothermic reaction or an external source. If necessary, a heating coil, wire or screen (not shown) may be appropriately placed between the inlet tube 13 and outlet tube 15 to initiate the reaction and/or stabilize the reaction so that the reactants are exposed to the required reaction conditions between the inlet 13 and outlet 15. Since the reactant materials are injected tangentially to the walls, the walls are at all times protected from the extreme heat and corrosive effects of the reaction by a continuously moving layer of fluid circulating adjacent the wall.

Since the high temperature reaction conditions occur as the reactants spiral toward the axis of the cylinder, the outlet tube 15 is positioned to be exposed to the highest reaction temperatures and, therefore, the most corrosive effects of the reaction. However, the portion of the exit tube 15 which is within the reactor is exposed to a very small pressure gradient. Thus the portion of the exit tube 15 which is inside the reactor must be capable of withstanding high temperatures and the corrosive effects of the reaction conditions, but need not exhibit the tensile strength and other characteristics required to contain high pressures. Accordingly, the exit tube 15 may be constructed of readily available suitable materials such as ceramics or the like which would not be suitable for forming the outer walls or other portions of the reactor exposed to high pressure differentials. The portion of exit tube 15 which extends outside the reaction chamber, however, must be capable of containing the pressure and temperature of the exiting fluid. Accordingly, the internal surface of the exit tube 15 which extends outside the cylinder may be appropriately protected with a ceramic liner or the like and/or the temperature of exiting fluid may be reduced such as by cooling the tube 15 as it passes through the cap 12.

It will be appreciated that since the walls of the reactor are protected from the heat and corrosive effects of the supercritical reaction, the reaction vessel itself may be fabricated from less expensive and more easily managed materials. Accordingly, the reaction vessel may be constructed so that it will readily contain pressures as high as 10,000 psi. The maximum pressure is, of course, virtually unlimited. Thus supercritical reactions may readily be conducted under extremely high pressures with reaction temperatures in range of 700° C. to 850° C. and higher using conventional materials for the containment vessel.

It will be recognized that since the reacting fluid spirals inwardly to form an axial vortex, the vertical inner walls of the reactor are isolated from the reaction conditions by incoming fluid. However, the inner surfaces of the ends of the reaction chamber are not so protected. Partial protection can be achieved, of course, by isolated cooling. However, this may affect the efficiency of the overall reaction. Protective coatings may also be employed.

In the embodiment illustrated in FIGS. 3–6 the entire internal surface of the reaction chamber is protected from the effects of the high temperature reaction contained therein. The embodiment of FIGS. 3–6 comprises a toroidal chamber with its axis of origin lying in a substantially horizontal plane. It will be recognized, however, that the orientation of the chamber has no material effect on the reaction processes described herein. The torus is illustrated in a horizontal orientation merely for convenience of illustration.

Figure 3:
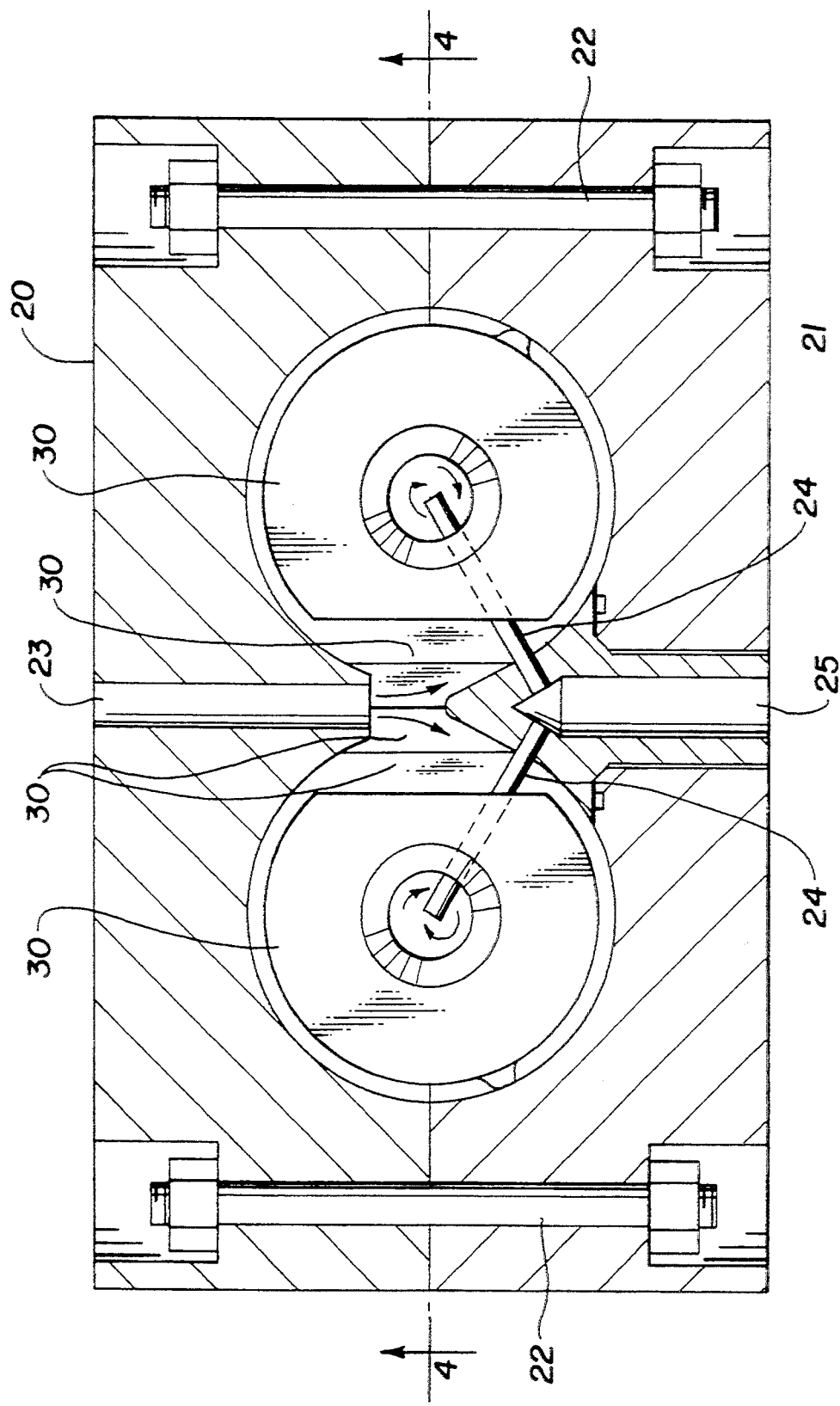
FIG. 3 is a sectional view of a toroidal reactor design employing the principles of the invention.

As shown in FIG. 3, a toroidal chamber is formed by mating two discs 20 and 21, each of which has a cavity in the mating surface which defines one-half of the torus on opposite sides of the plane in which the axis of origin of the torus lies. As illustrated in FIG. 3, discs 20 and 21 are sufficiently massive to contain the pressures under which reacting fluids will be contained within the chamber and are secured together in sealed relationship by bolts 22 or the like about their peripheries. The material of which discs 20 and 21 are formed must be of sufficient strength to contain the anticipated pressures and should be substantially inert to the reactants which will be injected into the chamber. However, as will be apparent from the following description, the discs 20 and 21 need not necessarily be inert to the corrosive effects and temperatures which will be formed by reactions occurring under supercritical water conditions within the chamber.

As illustrated in FIG. 3, reactants are injected into the toroidal chamber through a central inlet 23. The axis of the inlet 23 is substantially normal to the plane of the axis of origin of the torus and centrally located. Thus fluid injected into the toroidal chamber through inlet 23 is directed tangentially to the conic section of the chamber and thereby generates a mass of fluid which rotates about the axis of origin of the torus as indicated by the arrows in FIG. 3. One or more exit tubes 24 extend radially from near the axis of origin of the torus to a central outlet 25. Obviously, exit tubes 24 may be arranged as desired. The particular orientation illustrated is merely the presently preferred embodiment.

It will be recognized that the toroidal chamber of FIG. 3 is geometrically similar to the cylinder of FIG. 1 except that, since it is a torus, it defines a curved endless cylinder. Accordingly, since the reactants are injected tangentially and removed at the axis of origin, the reacting fluids form a rotating mass which spirals inwardly to form a vortex about the axis. However, since the axis of origin of the torus is a circle, the fluids rotating about that axis tend to diffuse axially (with respect to the axis of origin) rather than spirally inwardly toward the axis of origin because of the shape of the torus. To restrain such axial diffusion, flow guides or spacers 30 are positioned within the chamber to direct fluid flow in a spiral toward the axis of origin of the torus.

Figure 5:
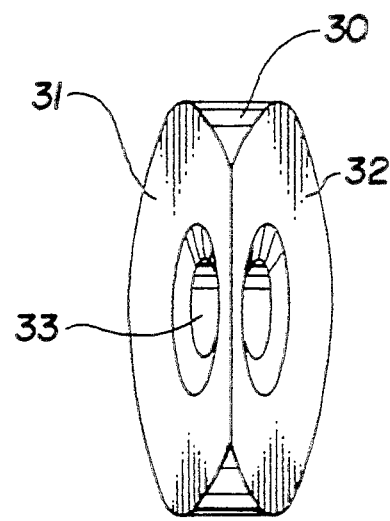
FIG. 5 is an edge elevational view of a flow guide used in the apparatus of FIG. 3.
Figure 4:
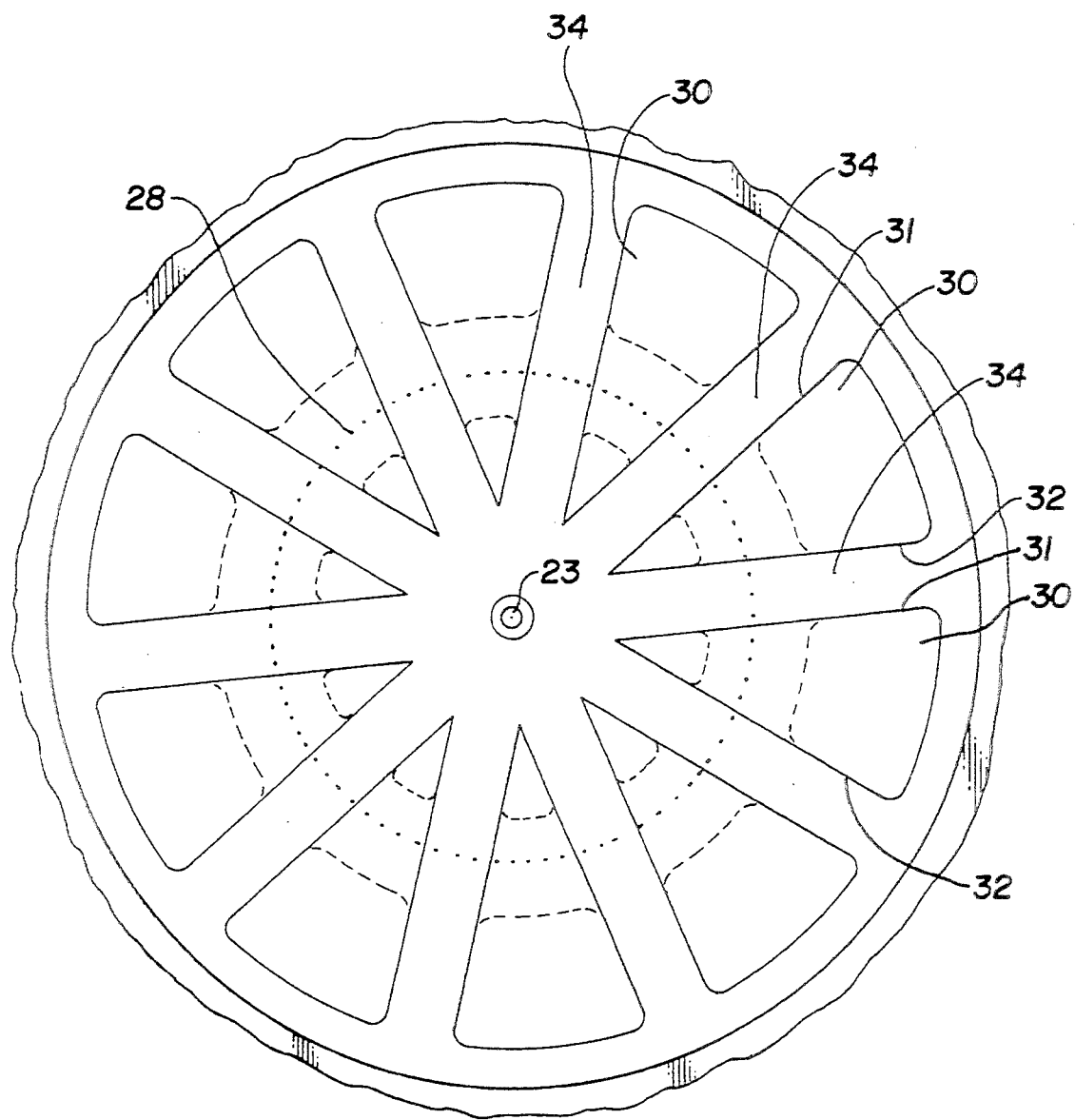
FIG. 4 is a sectional view of the reactor of FIG. 3 taken through line 4—4.

FIG. 4 illustrates the toroidal chamber of FIG. 3 in section taken along line 4—4. For clarity of illustration, the axis of origin is shown in dotted lines. In order to contain fluid rotation in a substantially spiral path around the axis of origin of the torus, flow guides 30 are positioned within the torus as shown. The flow guides 30 are substantially circular flat plates in the plane normal to the axis of origin of the torus (see FIGS. 3 and 6) and have sides 31 and 32 which project substantially radially from the axis of origin. Thus each flow guide 30 forms a wedge-shaped disc as best seen in FIGS. 4 and 5. Each disc preferably has a central aperture 33 substantially concentric with the axis of origin of the torus. The flow guides are substantially uniformly spaced within the chamber to define channels 34 therebetween which are of substantially uniform thickness in the direction of the axis of origin. The flow guides 30 thus contain fluid which enters inlet 23 and spirals about the axis of origin 28 in channels 34 to prevent diffusion in the direction of the axis 28. The reacting fluids are thus confined to a spiral movement to form a vortex surrounding the axis of origin 28.

As discussed above, the injected reactants circulate about the walls of the reaction chamber and spiral toward the vortex as they become hotter and less dense. Thus the cooler fluids form a shield which protects the walls of the chamber from the corrosive effects of the high temperature reaction occurring at or near the vortex. Since the torus is an endless cylinder, the reaction chamber has no ends which are exposed to the high reaction temperatures as in the right cylinder of FIG. 1. The flow guides 30, however, are fully exposed to the most corrosive regions of the reaction. The flow guides 30, however, merely occupy space and are not required to provide structural support other than to maintain their own structural integrity. They are not subjected to any substantial pressure gradients and thus may be fabricated from fragile materials such as ceramics and the like. The material selection for the flow guides 30 is, therefore, determined solely by ability to withstand high temperatures and the corrosive effects of the reactions which will occur in the vortex generated.

As discussed hereinabove with respect to exit tube 15, outlet tubes 24 are, at least at the ends which project into the vortex, subjected to the extreme conditions of the reaction. However, like the flow guides 30, exit tubes 24 are not subjected to substantial pressure gradients and require very little structural characteristics. Accordingly, these conduits may be fabricated from high temperature and corrosion resistant materials such as ceramics or the like.

It will be observed that in the toroidal chamber of FIG. 3, extremely high pressures can be contained by forming the discs 20 and 21 of suitable material of the desired dimensions. Since the walls of the reactor chamber are not subjected to the extreme conditions of the reaction, the material of the containment discs 20 and 21 may be selected without particular regard to the reaction conditions. Furthermore, the internal surfaces of the reaction chamber may be protected with a protective coating or the chamber itself may be formed by a reaction resistant shell which is supported by the discs 20 and 21. Since the extreme reaction conditions are confined to the vortex surrounding the axis of origin of the torus, the containment walls of the reactor chamber are substantially protected from the extreme conditions existing at the vortex. The only components of the system exposed to such extreme conditions are the flow guides 30 and the exit tubes 24. These components, however, comprise a relatively small portion of the system and are not subjected to appreciable mechanical stress. Thus the entire system can be fabricated from readily available materials and does not require use of any material which is corrosion resistant and temperature resistant in a mechanically stressed environment.

It will be readily appreciated that by employing the principles of the invention to maintain the high temperature reaction conditions spaced from the containment walls of the reaction vessel, the reaction vessel can be fabricated from materials which will withstand extreme pressures but which may not withstand the extreme temperatures of corrosive effects of the reactions confined to the vortex. Nevertheless, reactions can be contained and controlled under pressures as high as 340 bar or greater. Thus the advantages of high pressure reaction conditions can be obtained using materials for the containment vessel which would not withstand the temperatures and/or reaction effects of the reaction if exposed directly thereto. Accordingly, the invention permits the design and use of extremely high pressure reactions using readily available and less expensive materials.

While the invention has been described with particular reference to specific embodiments thereof, it is to be understood that the forms of the invention shown and described in detail are to be taken as preferred embodiments thereof. Various changes and modifications may be resorted to without departing from the spirit and scope of the invention as defined by the appended claims.

What is claimed:

1. A method of controlling flow of fluids reacting at supercritical water conditions comprising the steps of:
   (a) injecting fluid comprising water and substantially stoichiometric quantities of at least two reactants into a cylinder under pressure sufficient to approximate supercritical water conditions substantially tangentially to the inner wall of the cylinder;
   (b) causing said fluid to flow toward the axis of said cylinder and form an axial vortex displaced from said inner wall;
   (c) adding sufficient heat to said fluid to approximate supercritical water conditions and cause a chemical reaction to occur in said fluid; and
   (d) withdrawing fluid only from a single outlet extending into said axial vortex.

2. A method as set forth in claim 1 wherein the fluid injected into the cylinder is formed by simultaneously injecting the reactants into the cylinder through substantially parallel tubes.

3. A method as set forth in claim 1 wherein the fluid injected into the cylinder is formed by mixing the reactants to form a fluid which is injected into the cylinder.

4. A method as set forth in claim 1 wherein said fluid is heated by the heat of reaction of said reactants.

5. A method of controlling flow of fluids reacting at supercritical water conditions comprising the steps of:
   (a) injecting an aqueous fluid into a cylinder under pressure sufficient to approximate supercritical water conditions substantially tangentially to the inner wall of the cylinder;
   (b) causing said aqueous fluid to flow toward the axis of said cylinder and form an axial vortex displaced from said inner wall;
   (c) adding sufficient heat to said aqueous fluid to approximate supercritical water conditions and cause a chemical reaction to occur in said fluid; and
   (d) withdrawing fluid from said axial vortex only through an outlet extending into said vortex.

6. A method as set forth in claim 5 wherein said fluid injected in the cylinder comprises water and at least two reactants.

7. A method as set forth in claim 5 wherein said fluid injected into the cylinder comprises water containing substantially stoichiometric quantities of two reactants.

8. A method as set forth in claim 5 wherein the fluid injected into the cylinder is formed by mixing reactants and water to form a fluid which is injected into the cylinder.

9. A method as set forth in claim 5 wherein the fluid injected into the cylinder is formed by simultaneously injecting reactants and water into the cylinder through substantially parallel tubes.

10. A method as set forth in claim 5 wherein said fluid is heated by the heat of reaction of reactant in said fluid.

11. A method of controlling flow of reacting fluids in an aqueous stream at supercritical water conditions comprising the steps of:
    (a) injecting a fluid comprising an aqueous stream containing reactants into an enclosed container tangentially to a curved wall of the container under pressure sufficient to approximate supercritical water conditions;
    (b) reacting at least two reactants contained in said stream with each other;
    (c) containing movement of said fluid to substantially spiral paths from the point of injection to form a vortex spaced from the curved walls of the container; and
    (d) withdrawing fluid only from an outlet extending into said vortex.

12. A method as set forth in claim 11 including the step of heating said fluid as it moves from the point of injection toward said vortex.

13. A method as set forth in claim 12 wherein said fluid is heated by the heat of reaction of said reactants.

* * * * *

UNITED STATES PATENT AND TRADEMARK OFFICE
CERTIFICATE OF CORRECTION

PATENT NO. : 5,427,764
DATED : June 27, 1995
INVENTOR(S) : John S. Barber

It is certified that error appears in the above-indentified patent and that said Letters Patent is hereby corrected as shown below:

Col. 4, line 50, change "C." to read ---C---
Col. 4, line 51, change "C." to read ---C---
Col. 8, line 24, change "reactant" to read ---reactants---

Signed and Sealed this

Nineteenth Day of September, 1995

Attest:

BRUCE LEHMAN

Attesting Officer

Commissioner of Patents and Trademarks